Feb. 12, 1929.
H. B. ROWLAND
1,701,638
MACHINE FOR FORMING FIRE RETARDING STRIPS
Filed March 11, 1927
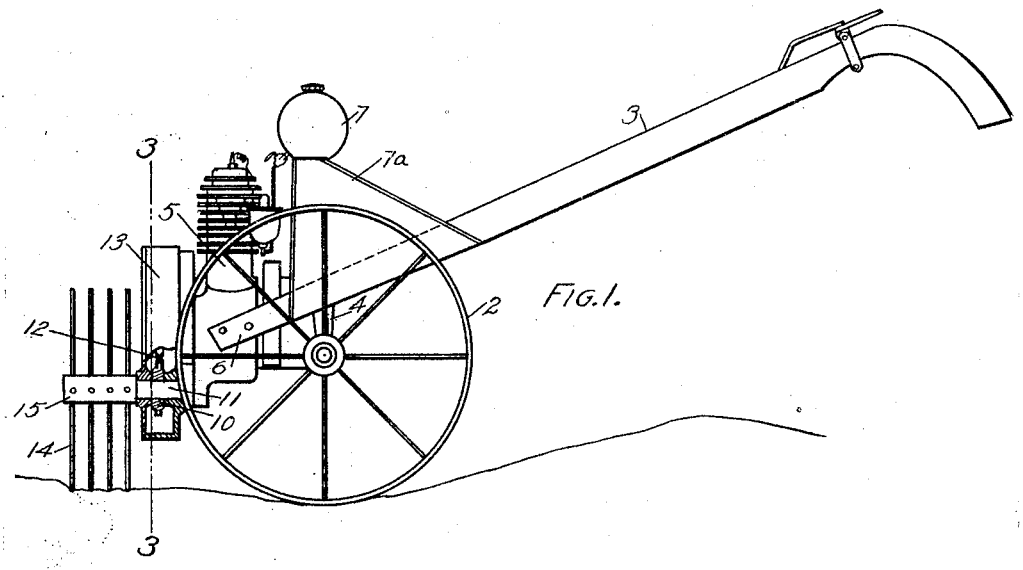
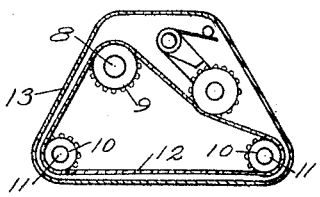
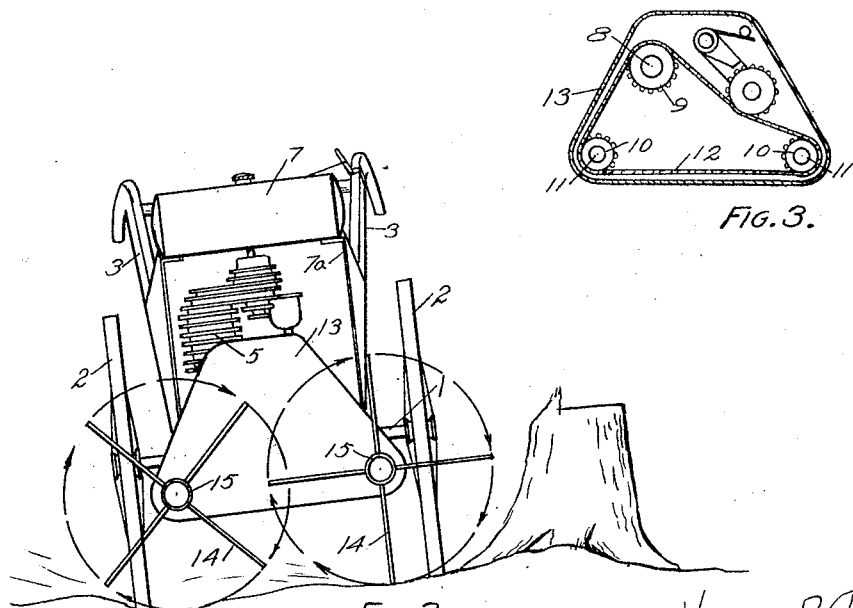
Horace B Rowland
INVENTOR.
BY N. C. Lord
ATTORNEYS.

Patented Feb. 12, 1929.

1,701,638

UNITED STATES PATENT OFFICE.

HORACE B. ROWLAND, OF WARREN, PENNSYLVANIA.

MACHINE FOR FORMING FIRE-RETARDING STRIPS.

Application filed March 11, 1927. Serial No. 174,468.

In forestry service it is common to form fire retarding strips through forests by cleanly raking the soil in a strip so that fire communicating material is eliminated from this zone. This has heretofore been accomplished by means of hand rakes. The nature of the ground which is usually uneven has made the utilization of any known machinery impractical. The present invention involves a machine capable of being handled under the ordinary forest conditions and by means of which a strip may be raked clean with power machinery, thus very greatly reducing the labor necessary to form such strips and at the same time more perfectly cleaning the strips than is usually practical by hand. Features and details of the invention will appear from the specification and claims.

A preferred embodiment of the invention is illustrated in the accompanying drawings as follows:—

Fig. 1 shows a side elevation of the machine.

Fig. 2 a front elevation.

Fig. 3 a section on the line 3—3 in Fig. 1.

1 marks the axle, 2 the wheels mounted on the axle, and 3 handles mounted on posts 4 extending from the axle. The handles are of the usual implement type and are shaped as to be readily grasped by the operator.

A motor 5 is secured between extensions 6 of the handles. It is supplied with fuel from a tank 7 mounted on a frame 7ª arranged on the handles.

A crank shaft 8 of the motor extends forward and aft or lengthwise of the machine and a sprocket 9 is secured to the forward end of the shaft. Sprockets 10 are journaled on shafts 11 extending forward from the motor frame and are driven by a sprocket chain 12. This chain and sprockets are arranged in a houisng 13.

Toothed wheels 14 are mounted on hubs 15, these hubs being journaled on the shafts 11 and secured to and extend forwardly from the sprockets 10. The toothed wheels are formed by radially extending spring wires which are fixed on the hub and are of quite rugged construction so that as they are moved over the ground they not only clean the surface but actually clean the strip, down to the mineral earth. The two toothed wheels preferably operate in the same direction so that the material loosened and moved to the side by one wheel is picked up and carried along by the other wheel so that the resultant strip which is covered by the two toothed wheels can be made bare of all fire communicating material. It will be noted that with the toothed wheels mounted in front of the axle and with axes lengthwise of the carrier and with a peripheral movement of the underside of the wheels across the path of the wheel carrier frame that the operator can by tilting the handles elevate and lower the wheels so as to follow depressions and clear mounds in the path of the strip. This adaptability is made more certain in that the toothed wheels can operate independently of movement of the wheel carrier. Thus the operator is able to completely clear the surface even though it may be necessary in spots to completely stop the carrier, or move it very slowly. While the power for driving the toothed wheels is furnished by the motor, the carrier can be readily propelled and steered by the operator and with this simple apparatus can accomplish a great deal more than is possible through the action of hand rakes and the strip is ordinarily more thoroughly cleaned than is practical with hand raking. One reason for this is that the rotary wheels are self-cleaning.

What I claim as new is:—

1. In a machine for forming fire retarding strips, the combination of a manually guidable wheel carrier; a motor on the carrier; a toothed wheel driven by the motor and independently of a movement of the carrier and having an axis lengthwise of the carrier, the underside of the toothed wheel having a peripheral travel across the path of the carrier whereby a fire strip may be raked clean to the mineral soil.

2. In a machine for forming fire retarding strips, the combination of a manually guidable wheel carrier; a motor mounted on the carrier; and a plurality of rotary wheels mounted on the carrier and driven by the motor and having axes lengthwise of the carrier, the undersides of the toothed wheels having a peripheral travel across the path of the carrier, one of the wheels supplementing the other in cleaning a fire strip whereby a fire strip may be raked clean to the mineral soil.

3. In a machine for forming fire retarding strips, the combination of a manually guidable wheel carrier; a motor on the carrier; and a plurality of toothed wheels mounted on the carrier driven by the motor in the same direction, said toothed wheels having axes lengthwise of the carrier, the underside of said wheels having a peripheral travel across the path of the carrier whereby a fire strip may be raked clean to the mineral soil.

4. In a machine for forming fire retarding strips, the combination of a manually guidable wheel carrier; a handle on the carrier; a motor on the carrier; and a toothed wheel driven by the motor independently of a movement of the carrier and having an axis lengthwise of the carrier, the underside of the toothed wheel having a peripheral travel across the path of the carrier whereby a fire strip may be raked clean to the mineral soil, the wheel being operable by the handle to vary its elevation.

In testimony whereof I have hereunto set my hand.

HORACE B. ROWLAND.